United States Patent [19]

Truong

[11] Patent Number: 5,461,301
[45] Date of Patent: Oct. 24, 1995

[54] DUAL SLOPE SOFT START FOR PULSE WIDTH MODULATOR CONTROLLERS USED IN POWER CONVERTERS

[75] Inventor: Kiem Truong, San Diego, Calif.

[73] Assignee: Qualidyne Systems, San Diego, Calif.

[21] Appl. No.: 5,960

[22] Filed: Jan. 19, 1993

[51] Int. Cl.$^6$ ..................................................... G05F 1/70
[52] U.S. Cl. .......................... 323/207; 323/222; 363/16; 363/37
[58] Field of Search .................. 323/205, 207, 323/211, 222; 363/16, 25, 23, 26, 37

[56] References Cited

U.S. PATENT DOCUMENTS

| | | | |
|---|---|---|---|
| 3,967,181 | 6/1976 | Chambers et al. | 363/23 |
| 4,097,863 | 6/1978 | Chambers | 343/5 R |
| 4,575,668 | 3/1986 | Baker | 318/811 |
| 5,003,454 | 3/1991 | Bruning | 363/81 |
| 5,068,590 | 11/1991 | Glennon et al. | 322/10 |
| 5,095,416 | 3/1992 | Ohms | 363/97 |
| 5,134,355 | 7/1992 | Hastings | 323/211 |
| 5,258,901 | 11/1993 | Fraidlin | 363/15 |

OTHER PUBLICATIONS

Data Sheet for Unitrode 250 Watt Preregulator pp. 4–191.
Dixon, Jr., "High Power Factor Preregulators for Off–Line Power Supplies," *High Power Factor Preregulators*, pp. 6–1–6–15.

*Primary Examiner*—Steven L. Stephan
*Assistant Examiner*—Adolf Berhane
*Attorney, Agent, or Firm*—Lowe, Price, LeBlanc & Becker

[57] ABSTRACT

A power converter including a regulator responsive to a rectifier supplies a load with a regulated DC voltage. The regulator has a variable duty cycle output and responds to AC current and voltage components of the converter to tend to maintain an in phase relation of AC voltage and current output components of the rectifier. If the converter is a DC—DC converter, it includes a regulator responsive to a DC power source supplies a load with a regulated DC voltage. The regulator has a variable duty cycle output and responds to a DC power source voltage, load voltage and load current to maintain a regulated DC load voltage. The regulator responds to abnormal operation of the converter, e.g. overshoot occurring after a power interrupt, to initially quickly reduce the duty cycle, then quickly restores or be allowed to quickly restore the duty cycle to a large percentage of a target value therefor and then slowly restore the duty cycle to its target without overshoot.

12 Claims, 7 Drawing Sheets

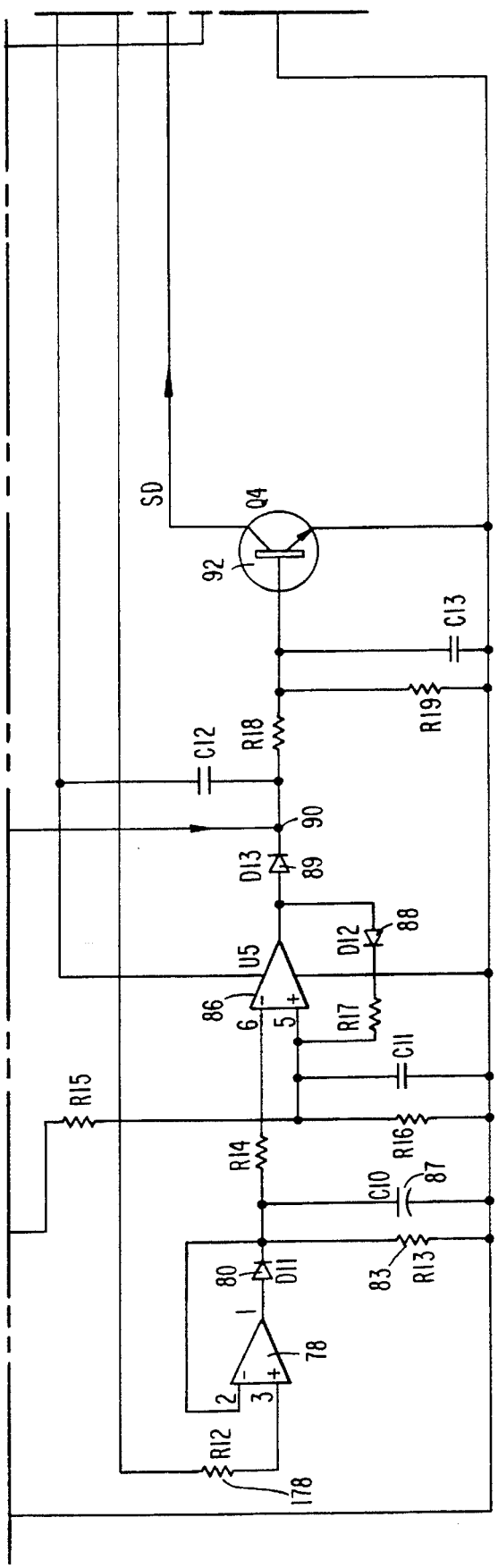
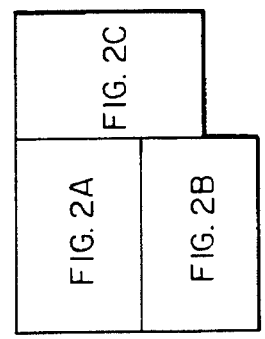
FIG. 2B
FIG. 2
| FIG. 2A | FIG. 2C |
| FIG. 2B | |

DUAL SLOPE SOFT START FOR PULSE WIDTH MODULATOR CONTROLLERS USED IN POWER CONVERTERS

FIELD OF INVENTION

The present invention relates generally to pulse width modulator controllers used in regulated power converters and more particularly to such a controller that quickly responds to an abnormal converter condition by quickly switching off power and then quickly restoring power by deriving a control signal that initially changes at rapid rates in opposite directions and then changes at a substantially slower rate without overshoot.

BACKGROUND ART

Power converters typically include a full wave rectifier responsive to an AC power line voltage. The rectifier drives a series inductor and a switch having an output voltage applied to a storage capacitor network. The switch duty cycle is controlled, frequently at a fixed frequency much higher than the line voltage frequency, so a regulated DC output voltage is developed across the storage capacitor network. To maintain the phases of AC voltage and current components derived from the rectifier as close to unity power factor as possible a controller for the switch duty cycle responds to voltage and current components derived by the rectifier, switch and capacitor. A controller of this type, commercially available from Unitrode in integrated circuit form, is referred to as a High Power Factor Preregulator with the nomenclatures UC1854, UC2854 and UC3854.

The Unitrode High Power Factor Preregulator includes an analog multiplier circuit having an output proportional to $$\frac{A \cdot B}{C},$$

where A, B and C are the amplitudes of analog input voltages applied to the multiplier. In one prior art configuration the values of B and C are respectively proportional to the instantaneous amplitude of the AC voltage component derived from the rectifier and the RMS value of the voltage derived from the rectifier. The value of A is somewhat more complex, being determined by the difference between a reference value and the DC output voltage of the capacitor network and a further factor controlled by abnormal operation of the converter, e.g. overshoot of the DC load voltage following restoration of power to the rectifier after a momentary interrupt of the AC source, lasting for a fraction to several cycles of the power line frequency.

The prior art circuit is referred to as a soft start circuit because it prevents overstressing of the switch and capacitors in the network, as can occur with the overshoot that frequently occurs upon restoration of power after a momentary power line interruption. The prior art soft start circuit has the disadvantage of requiring many cycles of the AC power line frequency to occur before the converter output voltage is restored to a substantial percentage of its desired value. The typical prior art soft start circuit includes a series resistor having a constant value and a capacitor or only a capacitor connected to a constant current source in the High Power Factor Preregulator.

It is, accordingly, an object of the present invention to provide a new and improved power converter with a high power factor preregulator arranged so that the converter output voltage is allowed to be quickly restored to a relatively high percentage of its desired value upon restoration of normal converter operation after abnormal operation thereof.

A further object of the invention is to provide a new and improved power converter with a high power factor preregulator arranged so that the converter output voltage is allowed to quickly restored to a relatively high percentage of its desired value upon restoration of input power after a momentary power loss to the converter.

Another object of the invention is to provide a relatively simple, new and improved high power factor preregulator circuit adapted for use with a power converter, wherein the preregulator includes a soft start circuit arranged to allow the converter output voltage to be returned quickly to a relatively high percentage of desired output voltage upon restoration of normal converter operation and after a momentary loss of same.

BRIEF DESCRIPTION OF THE INVENTION

In accordance with one aspect of the invention, a power converter responsive to a power source comprises a rectifier for deriving a rectified DC voltage in response to the source being connected to it. A switching regulator responsive to the rectified DC voltage derives variable duration DC pulses. The DC pulses are smoothed to a DC output voltage. The duration of the variable duration DC pulses is controlled in response to the rectified DC voltage and the switching regulator output. In response to an abnormal condition of the converter, the width of the pulses flowing from the switching regulator is reduced at a relatively fast rate, then the width of the pulses flowing from the switching regulator is increased at a relatively fast rate, and then the width of the pulses flowing from the switching regulator is increased at a relatively slow rate.

The converter preferably responds to indications of the magnitudes of AC current and voltage components in the converter for providing active power factor correction of AC current and voltage components derived from the rectifier and to an indication of the DC output voltage for controlling the width of the pulses so the pulse width (a) quickly drops to zero in response to the DC output voltage exceeding a predetermined value, (b) thereafter quickly increases in response to the DC output voltage being less than the predetermined value and (c) then increases at a protracted rate as a function of the indications of the magnitude of AC and DC currents and voltages in the converter. The fast rate to slow rate transition occurs at a predetermined percentage of a desired magnitude for the DC output voltage.

In accordance with another aspect of the invention, a power converter responsive to a power source for supplying a regulated DC voltage to a load comprises a rectifier and regulator means responsive to the rectifier for supplying the load with the regulated DC voltage. The regulator means responds to AC current and voltage components of the converter to control the phases of AC voltage and current components derived by the rectifier so the AC voltage and current components derived by the rectifier tend to be in phase with each other. The regulator means includes means for deriving a parameter for controlling the load voltage. The parameter has a target value associated with normal operation of the converter for a desired DC load voltage. Increases and decreases in the parameter value tend to respectively increase and decrease the load voltage. The regulator means responds to abnormal operation of the converter to initially reduce the parameter value at a fast rate, then restore the parameter value to a large percentage of the target value therefor at a fast rate and then restore the parameter value to its target value at a slow rate.

In accordance with a further aspect of the invention, a high power factor switching preregulator for controlling the application of power to a DC load by a regulated power converter including a full wave rectifier driven by a power source has first and second signal input terminals respectively responsive to AC components derived from the rectifier and supplied to the load. Multiplier means responsive to replicas of the AC components supplied to the first and second input terminals derives a control signal having a target value during normal operation of the load and rectifier. A switch responds to the control signal. In response to an abnormal condition associated with abnormal operation of the converter at one of the terminals the control signal is (a) quickly changed in a first direction, (b) then quickly changed in a second opposite direction when the abnormal condition no longer exists and (c) then slowly changed in the second direction until the control signal returns to the target value. The control signal quickly changes in the second direction until it comes close to the target value relative to the value of the control signal at the time the control signal starts to change quickly in the second direction.

In the preferred embodiment of the converter and the preregulator the quick and slow changes are provided with a capacitor charging circuit. The charging circuit discharges a capacitor at a rapid rate in response to the abnormal condition. The charging circuit then quickly establishes a relatively high percentage of desired voltage at a control terminal when the abnormal condition no longer exists. Then the charging circuit charges the capacitor at a protracted rate while the slow change occurs.

Preferably the charging circuit includes an impedance having a variable voltage or current responsive resistance having: a low value to quickly discharge a capacitor according to the quick change in a first direction in response to the abnormal condition; a relatively high value to quickly develop a stable and relatively high percentage of desired voltage from a current flowing through it according to the quick change in a second opposite direction when the abnormal condition no longer exists. The resistance allows the current flowing through it to charge a capacitor at a protracted rate according to the slow change in the second direction until the control signal returns to a target value for the normal condition. The charging circuit preferably includes a DC current source or a voltage source and a series resistor, in series with the capacitor and a Zener diode that forms the variable resistance. A switch in parallel with the Zener diode and capacitor is (a) normally open, (b) closed in response to the abnormal condition and while the capacitor is rapidly discharged, and (c) open while the capacitor is being rapidly charged.

The above and still further objects, features and advantages of the present invention will become apparent upon consideration of the following detailed descriptions of specific embodiments thereof, especially when taken in conjunction with the accompanying drawings.

DESCRIPTION OF THE PREFERRED EMBODIMENT

Figure 1:
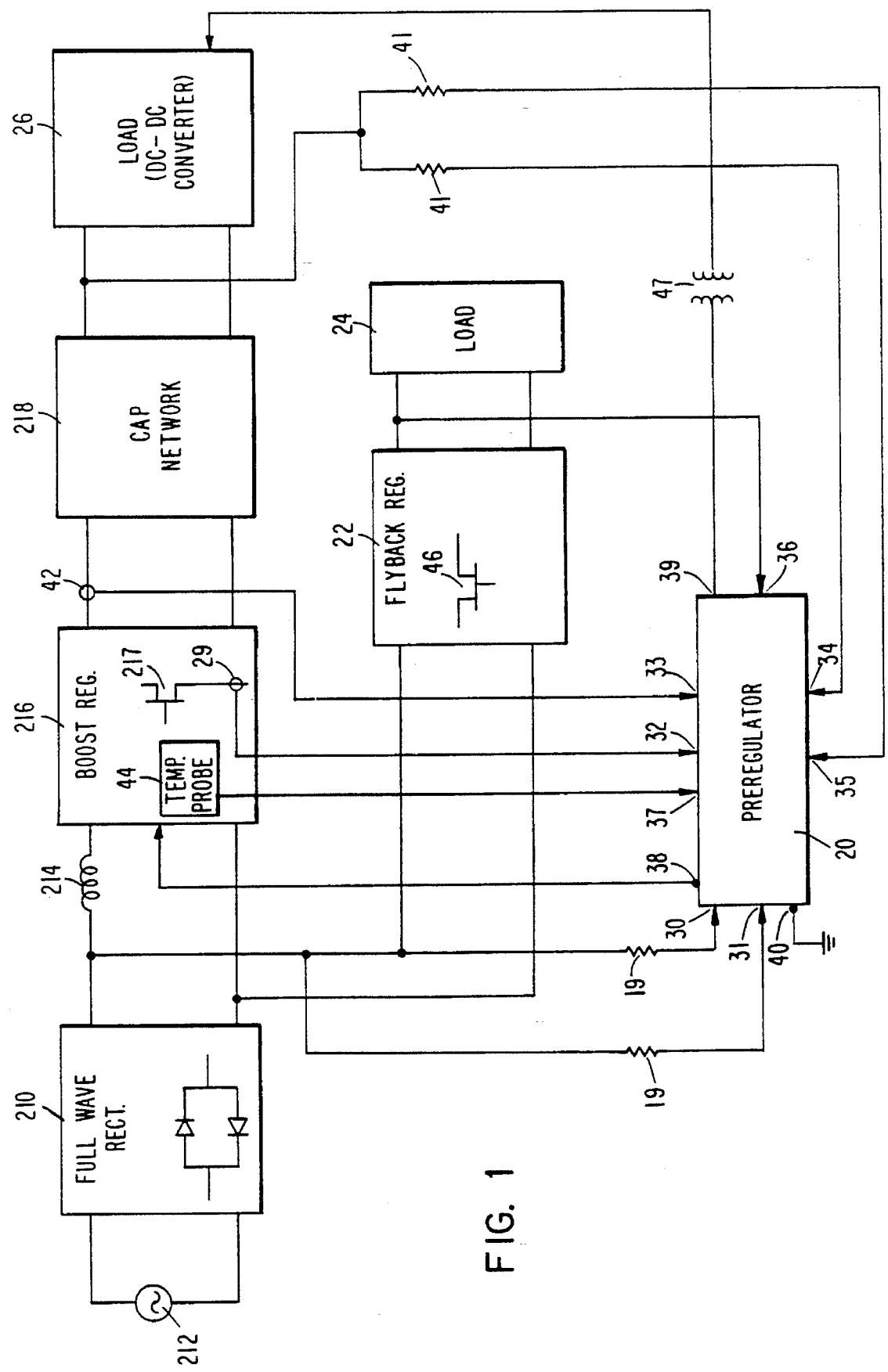
FIG. 1 is a partial block—partial schematic circuit diagram of a regulated AC to DC converter of the type with which the present invention is preferably employed.

FIG. 1 is a diagram of a regulated power converter of the type with which the present invention is particularly adapted to be used. The regulated converter of FIG. 1 includes full-wave rectifier 210 responsive to AC power line source 212, typically having a frequency of 50 or 60 Hertz and a voltage of approximately 230 volts. Full-wave rectifier 210 derives an output that is applied to series inductor 214, which in turn drives boost regulator 216 including shunt field effect switching transistor 217 operated at a fixed switching frequency and variable duty cycle. The voltage developed across boost regulator 216 is applied to storage capacitor network 218, across which is derived a DC voltage that is supplied to load 26, such as a DC—DC converter.

In one preferred embodiment, the output of full-wave rectifier 210 drives flyback regulator 22 in parallel with inductor 214 and boost regulator 216. Flyback regulator 22 typically derives a DC output voltage of about 25 volts, which is applied to load 24. This is in contrast to the several-hundred volt DC output typically supplied by capacitor network 218 to load 26.

Preregulator 20 (preferably including a High Power Factor Preregulator of the type previously mentioned) responds to the amplitude of AC and DC components of the voltages derived by rectifier 210, capacitor network 218 and flyback regulator 22 and currents flowing in and from boost regulator 216 to: (1) maintain the voltage and current derived by the rectifier nearly in phase with each other and (2) regulate the magnitude of the converter DC output voltage. Preregulator 20 is arranged so that when power from source 212 is restored, after momentary interruptions of AC supply voltage source 212, there is virtually no overshoot in the voltage applied to capacitor network 218 and to load 26, even though the load voltage is allowed to be quickly restored to a very high percentage of its desired value.

Preregulator 20 includes input terminals 30 and 31, driven in parallel via isolating resistors 19 by the full-wave rectified output voltage of rectifier 210. Preregulator 20 also includes input terminals 32 and 33, respectively responsive to replicas of the instantaneous currents flowing (1) through shunt switching transistor 217 of boost regulator 216 (as monitored by current transformer 29) and (2) from the boost regulator (as monitored by current transformer 42). The voltages applied to terminals 32 and 33 are applied to low pass filters in the preregulator to derive signals respectively representing the average values of the shunt and series currents of boost regulator 216. Signals indicative of the DC voltage applied by capacitor network 218 to load 26 are supplied to input terminals 34 and 35 of preregulator 20 via isolating resistors 41, connected in parallel to the output terminal of the capacitor network. Preregulator 20 also includes input terminal 37 responsive to a voltage indicative of the temperature of a heat sink (not shown) for transistor 28, as monitored by temperature probe 44 on the heat sink.

Preregulator 20 responds to the signals supplied to it, as well as clock signals it generates internally to derive a fixed frequency, variable duty cycle signal to control the on and off times of shunt transistor 217 of boost regulator 216 and to control synchronization, at a fixed frequency, of a DC—DC converter, as indicated by load 26, via transformer 47. In accordance with the present invention, the voltage applied by capacitor 218 to load 26 is allowed to be restored quickly to close to a desired value therefor (in considerably less than the one cycle of source 212) after a momentary interruption of AC power source 212 or shutdown of the converter due to excessive overvoltage supplied by capacitor network 218 to load 26. After the voltage of load 26 has been restored close to the desired value, the load voltage gradually increases to the desired value without overshoot. In the prior art, many cycles of AC source 212 are required to drive the voltage of load 26 close to the desired value therefor in the aforementioned situations.

Figure 2A:
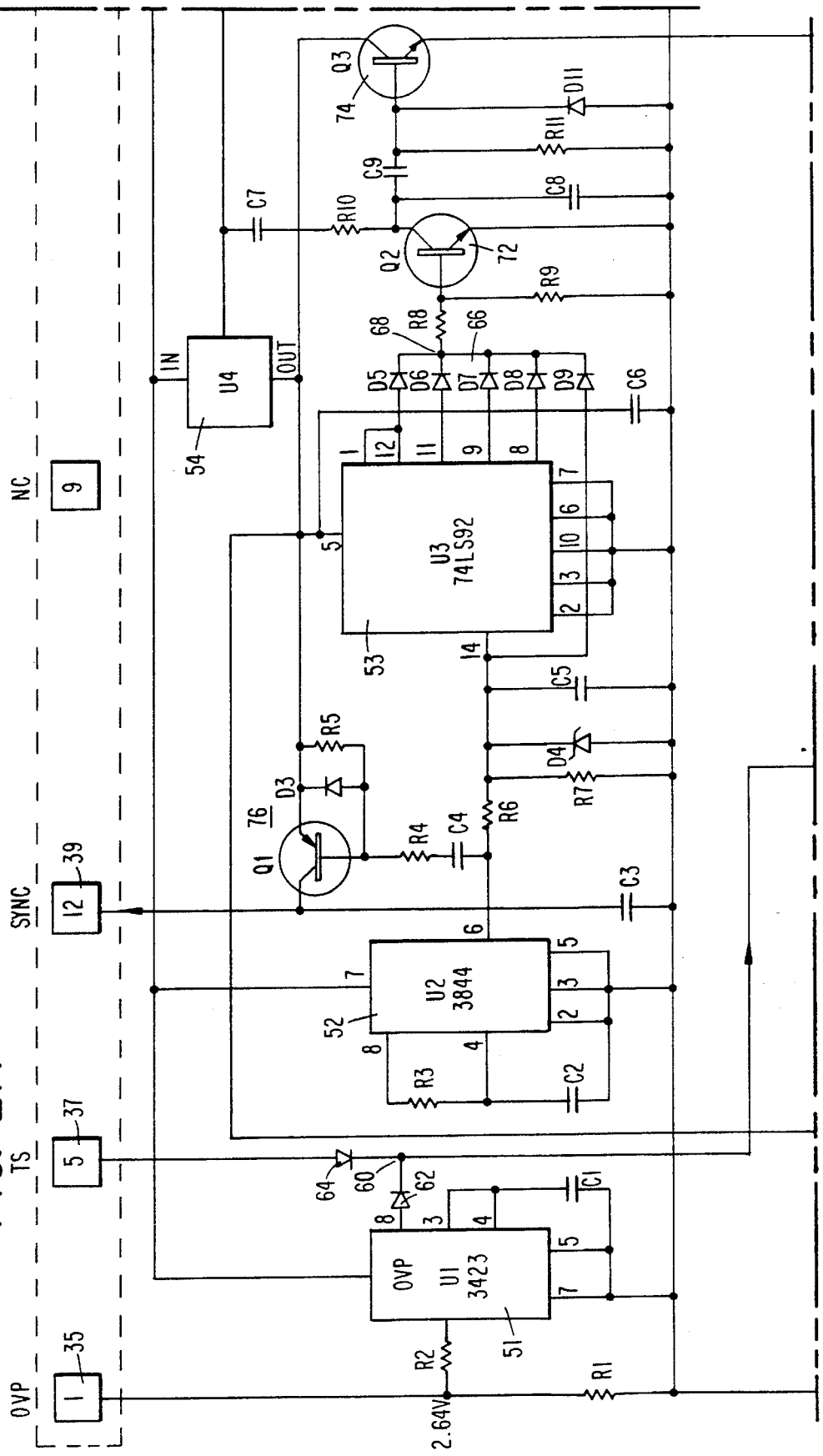
FIG. 2 is a circuit diagram of a preregulator included in a preferred embodiment of the present invention.
Figure 2C:
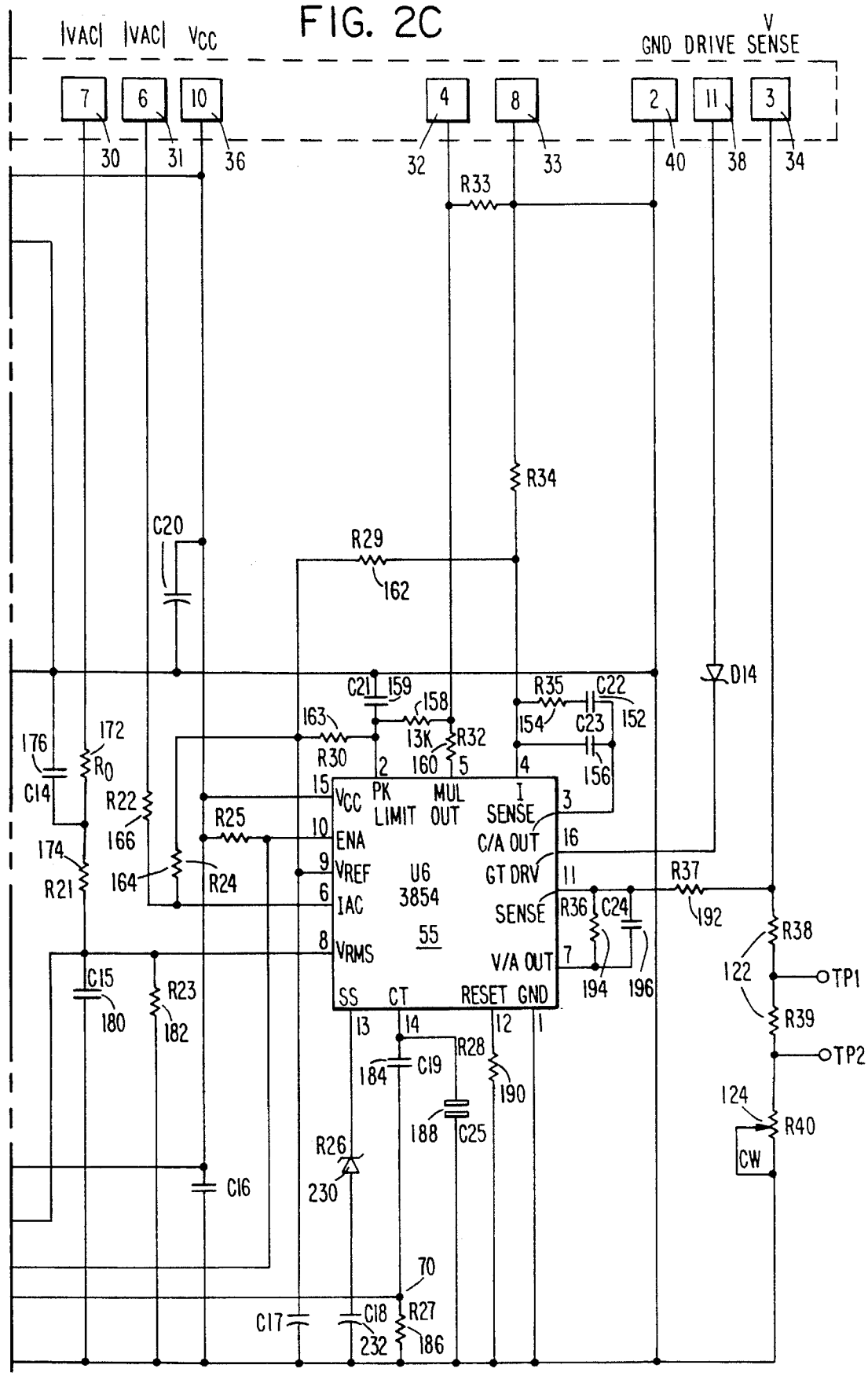

A preferred embodiment of preregulator 20 is illustrated in FIG. 2 as including integrated circuits 51–55. In the preferred embodiment, integrated circuits 51–55 are respectively types 3423, 3844, 74LS92, 7805 and 3854. For convenience, the numbers of the terminals or pins of these commercially available integrated circuits are employed in the present description. Each of integrated circuits 51–55 is supplied with DC power by the approximately 24-volt output of flyback regulator 22, as coupled to power supply terminals of these integrated circuits by way of terminal 36. Each of integrated circuits 51–55 also includes a ground terminal, connected to external ground terminal 40.

Integrated circuit 51 is an over-voltage protection circuit having input pin 2 connected to be responsive to the voltage supplied by capacitor network 218 to load 26 and coupled to terminal 35 of preregulator 22. During normal operation of the converter of FIG. 1, circuit 51 derives a relatively low voltage at output terminal 8 thereof; if the voltage at terminal 35 exceeds a predetermined magnitude, associated with an over-voltage at the output of capacitor network 218, the output voltage of circuit 51 at terminal 8 changes from a low to a relatively high positive DC value.

The voltage at output terminal 8 of integrated circuit 51 is applied to node 60 by way of diode 62. Node 60 is also responsive to the voltage proportional to the temperature of the heat sink for shunt transistor 217, as coupled to terminal 37 by temperature probe 44. In response to the temperature of the heat sink exceeding a predetermined value, the voltage supplied by probe 44 to terminal 37 exceeds a predetermined positive level, that is coupled through diode 64 to node 60 to signal that the converter should be shut down because of excessive heating of shunt switching transistor 217. Hence, the voltage at node 60 has a positive, high value only if shutdown should occur in response to an over-voltage being supplied to load 26 or excessive heating of shunt switch 217 of boost regulator 216.

Integrated clock circuit 52 is connected to external resistors and capacitors so that a constant frequency square wave having a frequency (preferably, 60 kHz) many times the frequency of power source 212 are derived at output terminal 6 thereof. The output of clock integrated circuit 52 is applied to input terminal 14 of frequency divider 53, having plural output terminals connected by diodes 66 to node 68. Diodes 66 are connected to output terminals of integrated circuit 53 so that a square wave voltage having a frequency equal to one-half of the frequency of clock circuit 52 is derived at node 68. It is to be understood, however, that in other situations it is desirable to connect other combinations of the output terminals of integrated circuit 53 to node 68 to supply different frequencies (all of which are many times the frequency of source 212) to the node.

Integrated circuit 54 is a voltage regulator, deriving a regulated +5 volt DC output. The regulated output of integrated circuit 54 is applied to several bipolar transistors requiring regulated power supply voltages.

The square wave (preferably 30 kHz) at node 68 is applied to pulse-shaping network 70 including NPN transistors 72 and 74. The output of pulse-shaping network 70, at the emitter of transistor 74, is applied to input terminal 14 of integrated circuit 55.

The 60 kHz output of clock circuit 52 is applied to the base of PNP driver transistor 76, having a collector connected to output terminal 39. The resulting, shaped pulses at output terminal 39 are applied via pulse transformer 47 to a DC—DC converter as indicated by load 26.

A replica of the full-wave rectified voltage derived by rectifier 210 is supplied via terminal 30 and a low pass filter including series resistors 172 and 174, as well as shunt capacitor 176 and series coupling resistor 178, to a non-inverting input terminal of operational amplifier 78. An output of amplifier 78 is supplied to series diode 80 and shunt low pass filter 82 including resistor 83 and capacitor 84. The positive voltage developed across filter 82 is applied to an inverting input terminal of operational amplifier 86, having an output connected to diodes 88 and 89 so that the voltage at node 90 is positive and relatively high in response to an interruption in the voltage of AC power source 212, as reflected in a low output voltage of rectifier 210 and at terminal 30. Node 90 is tied to node 60 so that the voltage at node 90 is also relatively high and positive in response to abnormal converter operation signalled by (1) an over-voltage output of capacitor network 218 as signalled by a high voltage at terminal 35, (2) an interruption of AC power, as signalled by a low voltage at terminal 30, or (3) an excessively high temperature of the heat sink for switching transistor 217.

The voltage at node 90 is supplied to the base of NPN transistor 92, having a normally cutoff emitter collector path. In response to the voltage at node 90 having a relatively high positive value for any of the three aforementioned reasons, the emitter collector path of transistor 92 is activated into a low impedance, conducting state, so that a relatively low voltage, approximately at ground level, is applied to input terminal 10 of integrated circuit 55.

Figure 3:
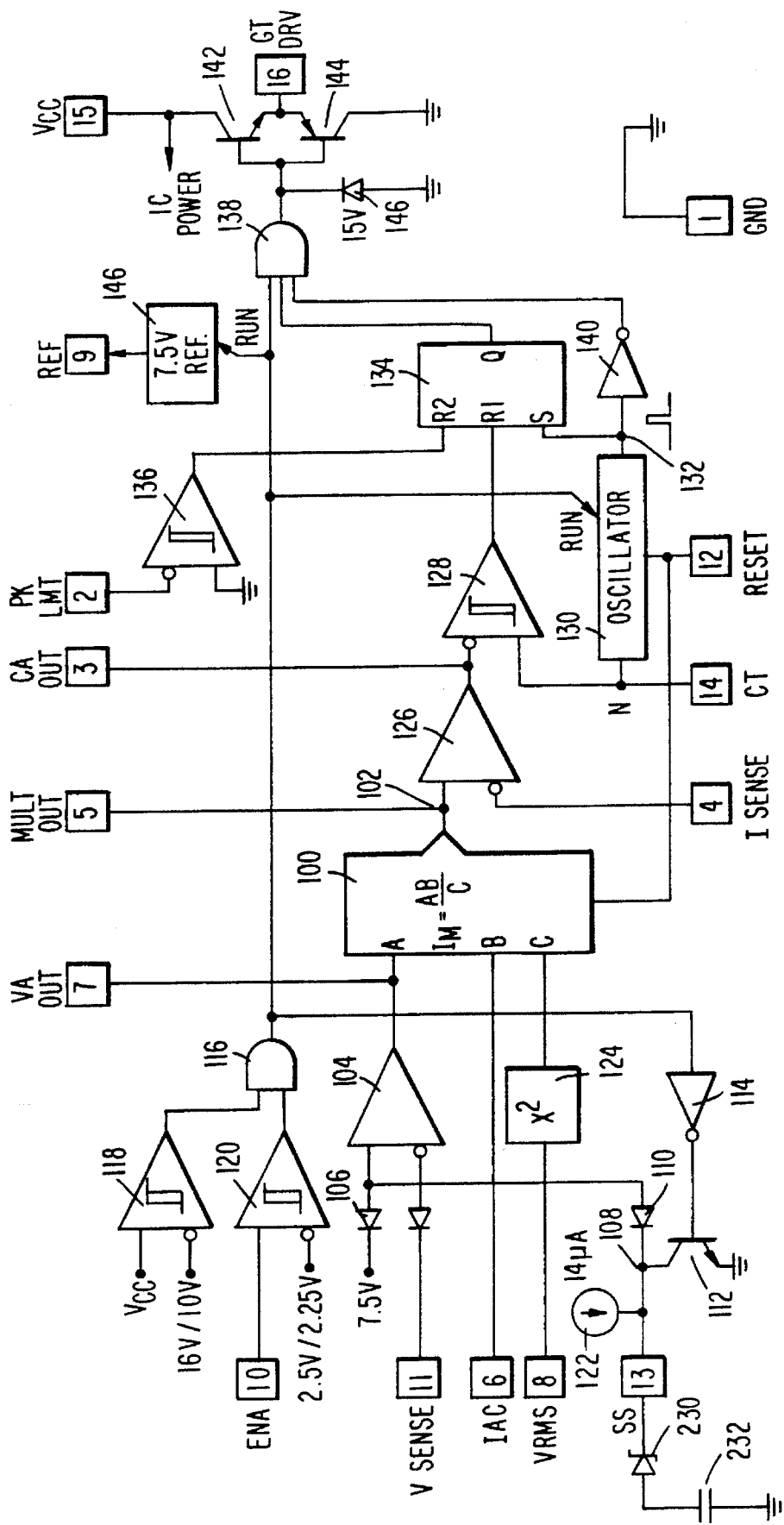
FIG. 3 is a circuit diagram of a high power factor preregulator included in the circuit of FIG. 2.

A partial block and partial schematic diagram of integrated circuit 55 is illustrated in FIG. 3 as including analog multiplier 100 having input terminals A, B and C and output terminal 102 on which is derived a voltage representing the magnitudes of the voltages at terminals A, B and C in accordance with $$\frac{A \cdot B}{C}.$$

In the preferred embodiment, integrated circuit 55 is a Unitrode High Power Factor Preregulator, as discussed supra. The B and C inputs terminals of multiplier 100 are respectively responsive to voltages proportional to the instantaneous value of the AC output components of the output of rectifier 212 and the RMS value of the rectifier output. The A input terminal of multiplier 100 is responsive to the AC component of the voltage supplied by capacitor network 218 to load 26 as selectively modified by a voltage waveform that is derived when an abnormal condition of the converter is sensed. The voltage waveform has a very high slope negative going leading edge. When the abnormal condition has been remedied, the waveform has a very high slope positive going trailing edge until the load voltage comes close to the desired value for it. The waveform then has a low positive going slope until the load voltage reaches its desired value.

The A output terminal of multiplier 100 is responsive to the output signal of difference amplifier 104 having an inverting input terminal responsive to a replica of the output voltage of network 218 as coupled via terminal 34 to pin 11 of integrated circuit 55. The non-inverting input terminal of amplifier 104 is responsive to the lower of a 7.5 volt DC bias voltage at the cathode of diode 106 or the previously mentioned voltage waveform which is derived at node 108 and coupled through diode 110 to the non-inverting input terminal.

Node 108 is shunted by the emitter collector path of a switch including NPN transistor 112. Transistor 112 is normally biased to a non-conducting state because its base is connected to the output of inverter 114, that is normally at a low level. Inverter 114 is driven by the output of AND gate 116, normally maintained at a high level. AND gate 116 includes a pair of input terminals respectively responsive to outputs of comparators 118 and 120 both of which are high during normal operation of the AC to DC converter of FIG. 1. Comparator 118 has inverting and non-inverting input terminals respectively responsive to a reference voltage and to the DC power supply terminal of integrated circuit 55. Comparator 120 has inverting and non-inverting input terminals respectively responsive to a reference voltage, having a lower value than the reference voltage for the inverting input terminal of comparator 118, and the voltage at pin 10 of integrated circuit 55. The voltage at pin 10 of integrated circuit 55 is normally at a high level due to the pin being connected to the output of regulator 22 via terminal 36. The voltage drops to a low level when abnormal converter operation is signalled by the voltage at node 90 (FIG. 2) increasing to a level to forward bias normally back biased NPN transistor 92. Node 108 is also connected to constant current source 122 and to pin 13 of integrated circuit 55. The circuitry connected to pin 13, which differentiates the present invention from the prior art and enables the previously mentioned voltage waveform to be derived, is described infra.

In response to an over-voltage at the output of the AC to DC converter of FIG. 1 or an interruption of the AC input to the converter or a high temperature of transistor 217, the output of comparator 118 or comparator 120 drops to a low voltage, causing the output of AND gate 116 to drop to a low value. In response to the output of AND gate 116 dropping to a low value, inverter 114 forward biases the base of NPN transistor 112, to turn the transistor emitter collector path into an on state, so node 108 is effectively grounded in response to any of these abnormal conditions.

Input terminal B of multiplier 100 is connected to pin 6 of integrated circuit 55 to be responsive to the instantaneous magnitude of the AC voltage component at the output of rectifier 210. Terminal C of multiplier 100 is indicative of a voltage directly proportional to the square of the output voltage of full wave rectifier 210, i.e. the RMS value of the output voltage of supply 212. To this end, the voltage at terminal 30 is coupled through the low pass filter including resistors 172, 174 as well as capacitor 176 to pin 8 of integrated circuit 55, thence to analog squaring circuit 124 which drives input terminal C of multiplier 100.

The output of multiplier 100 is applied to a non-inverting input terminal of difference amplifier 126, having an inverting input terminal responsive to the voltage at pin 4 of integrated circuit 55. The voltage at pin 4 is a replica of the output current of boost regulator 216, as coupled to the pin via current transformer 42 and terminal 33. Difference amplifier 126 derives an output voltage that is supplied to pin 3 of integrated circuit 55 and an inverting input terminal of comparator 128, having a non-inverting input responsive to a triangular wave output of oscillator 130. The triangular wave output of oscillator 130 has a frequency slightly less than 30 kHz and a ramp up time that is considerably longer than the ramp down time thereof. Oscillator 130 includes output terminal 132 on which is derived short duration pulses which occur simultaneously with the positive going to negative going transition in the triangular wave output of the oscillator. Oscillator 130 is reset in response to a 30 kHz reset voltage being derived by pulse shaper 70 and applied to pin 12 of integrated circuit 55. Oscillator 130 is activated to a "run" state only in response to AND gate 116 deriving a high output level, as occurs during normal operation of the converter.

The outputs of comparator 128 and oscillator 130 at terminal 132 are respectively applied to a first reset input terminal (R1) and a set terminal (S) of flip-flop 134, having a second reset input terminal (R2) responsive to the output of comparator 136. Comparator 136 includes inverting and non-inverting input terminals; the inverting terminal is connected to the signal at pin 2 of integrated circuit 55, coupled to and responsive to the voltage at terminal 32, indicative of the current flowing through shunt transistor 217, while the non-inverting terminal is connected to ground at pin 1.

Flip-flop 134 responds to the inputs thereof to derive a variable duty cycle rectangular wave for controlling the on and off times of shunt transistor 217 of boost converting regulator 216. The duration of high level pulses at the Q output terminal flip-flop 134 is controlled by the amplitude of the AB/C signal at terminal 102 of multiplier 100 relative to the amplitude of a voltage proportional to the output current of boost converter 216, as coupled to pin 4 of integrated circuit 55 via current transformer 42 and terminal 33. The resulting voltage derived by difference amplifier 126 is compared by comparator 128 during each cycle of oscillator 130 with the ramping output voltage of the oscillator to control when flip-flop 134 is reset, which in turn controls the duty cycle of transistor 217 at the 30 kHz output of pulse shaper 70. If the shunt current of boost regulated converter 216 flowing through transistor 217 as coupled to pin 2 of integrated circuit 55 drops below a reference value, the Q output terminal of flip-flop 134 is maintained in a low state.

The voltage at the Q output terminal of flip-flop 134 is applied to one input of AND gate 138, having second and third inputs respectively responsive to the normally high output of AND gate 116 and the output level of inverter 140 that is positive except when the short duration pulse is derived at terminal 132. Under normal operating conditions, AND gate 138 derives a sequence of constant frequency, variable duration pulses, each having a length controlled by the output level of amplifier 126. In response to the short duration, high level output pulses of oscillator 130 at terminal 132 causing inverter 140 switching from a high to a low state momentarily, AND gate 138 derives a low level output. AND gate 138 remains in the low state while the low level is derived by flip-flop 134. Flip-flop 134 derives the high level immediately after the positive to negative going transition occurs in the output of inverter 140. In response to the output of flip-flop 134 changing from a low level to a high level in response to the transition in the output of comparator 128, AND gate 138 is activated to a high level output, while the output of AND gate 116 remains high. If the output of AND gate 116 drops to a low level because of an excessively high output voltage of the converter or an interruption in the AC power supply to the converter, the output of AND gate 138 drops to a low level.

The output of AND gate 138 is applied to the bases of complementary driver transistors 142 and 144, having common emitter terminals coupled to the base of transistor 217 via output pin 16 of integrated circuit 55. The series connected emitter collector paths of transistors 132 and 134 are connected between integrated circuit power supply pin 15 and ground at pin 1. The output terminal of AND gate 138 is shunted by Zener diode 146. In response to a high level being derived by AND gate 138, transistor 142 is biased into a conducting state while transistor 144 is biased to cut off, so that the common emitter connection thereof, at pin 16 of integrated circuit 55, is at a high level. In contrast, in response to the output of AND gate 138 changing from a high to a low level, transistor 144 is forward biased while transistor 142 is back biased, to ground pin 16. Thereby, pin 16 supplies sufficient current to the shunt transistor 217 of boost regulator 216 via Zener diode 198 and terminal 38 to drive the boost regulator transistor between the on and off states.

While a binary 1 level is being derived by AND gate 116, reference source 146 is activated to supply pin 9 of integrated circuit 155 with a 7.5 volt level. Pins 3, 5 and 7 respectively derive output voltages commensurate with the voltages at the output terminals of difference amplifier 126, multiplier 100 and difference amplifier 104. The voltages at pins 3, 5 and 7 are respectively coupled to pins 4, 2 and 11 by different feedback circuits, as illustrated in FIG. 2; the feedback circuit between pins 3 and 4 includes series capacitor 56, shunted by the series combination of resistor 154 and cap 152. The feedback circuit between pins 5 and 2 includes resistors 160 and 158. The feedback circuit between pins 7 and 11 includes the parallel combination of resistor 194 and capacitor 196. For testing and range adjusting purposes, input terminal 34, connected to pin 11 of integrated circuit 55, is connected to fixed resistors 122, series connected with variable resistor 124, in turn connected to ground.

The prior description of the components and subassemblies included in FIGS. 1–3 is substantially similar to the prior art. In the prior art, pin 13 is connected to ground by way of a capacitor or the series combination of a capacitor and a fixed resistor. This causes a constant relatively long ramp to occur between an interrupt or excess output voltage and restoration of proper operation of the converter. Thereby, a long time interval occurs between shut down due to abnormal converter operation and restoration of DC output voltage approaching the desired load voltage.

In accordance with the present invention, dual slope operation at pin 13 to control the output of regulator 218 is provided by the series combination of a capacitor and a variable voltage or current responsive resistance. To this end, pin 13 is connected to ground via Zener diode 230, series connected with capacitor 232.

In response to abnormal operation of the converter causing the output of AND gate 116 to change from a relatively high to a relatively low value, which in turn causes the output of inverter 114 to change from a low to a high value, transistor 112 switches from a normally non-conducting to a conducting state. The voltage at pin 13 of integrated circuit 55 thereby drops virtually to ground and causes the Zener diode to switch to the forward biased p-n junction mode so the diode has a low resistance. Thereby, capacitor 232 discharges at a high rate through the low resistance of Zener diode 230 to quickly reduce the voltage at the non-inverting input terminal of differential amplifier 104. The fast reduction in the voltage at the non-inverting input terminal of differential amplifier 104 causes corresponding decreases at the input terminal A and output terminal 102 of multiplier 100. The reduction in the output voltage of multiplier 100 causes a corresponding reduction in the voltage at the output terminal of differential amplifier 126 and a reduction in the voltage applied to the inverting input terminal of comparator 128. The fast decrease in the voltage at the inverting input terminal of comparator 128 quickly decreases the duty cycle of the voltage at terminal 16 of integrated circuit 55. The lower duty cycle at pin 16 decreases the on time of shunt transistor 217 to decrease the duty cycle of the output of regulator 216 and decrease the output voltage of capacitor network 218. Thereby, there is a relatively fast decrease in the output voltage of network 218 in response to the sudden decrease in the voltage at node 108.

Operation of the circuit continues in this manner until the output of AND gate 116 changes from a low to a high state, resulting in the output of inverter 114 returning to the low state to switch off transistor 112. When transistor 112 switches off, Zener diode 230 is switched to the reverse biased Zener mode to quickly establish a Zener voltage at pin 13; the Zener voltage is a relatively high percentage of the target value. Thereby the duty cycle at pin 16 and shunt transistor 217 is quickly increased, allowing rapid increases at the output of boost regulator 216 and the DC output voltage of network 218. While in the reverse biased Zener mode, Zener diode 230 allows the current to flow through it from a current source or a voltage source to charge capacitor 232. Thereby the voltage at pin 13 of integrated circuit 55, or node 108, increases at a much slower rate that is determined by the charging current and the capacitance value of capacitor 232, until the target voltage is reached. The duty cycle at pin 16 is slowly increased causing slow increases, without overshoot, of the DC output voltage of network 218 to the target value of normal operation. During normal operation of the apparatus illustrated in FIG. 1, the voltage at pin 13 of integrated circuit 55 is held at its target value and the non-inverting input of differential amplifier 104 is not normally subject to substantial, if any, variation during normal operation.

Hence, dual slope operation of the converter is provided with the illustrated circuit. When normal operation of the converter is restored the duty cycle of the output voltage at pin 16 of integrated circuit 55 and coupled to output terminal 38 of preregulator 20 controls transistor 217 of boost regulator 216 in such a way that the voltage supplied to load 26 initially quickly increases to within a few percentage of desired value. Thereafter, the voltage applied to load 26 more slowly increases, without overshoot, to its desired value.

Figure 4:
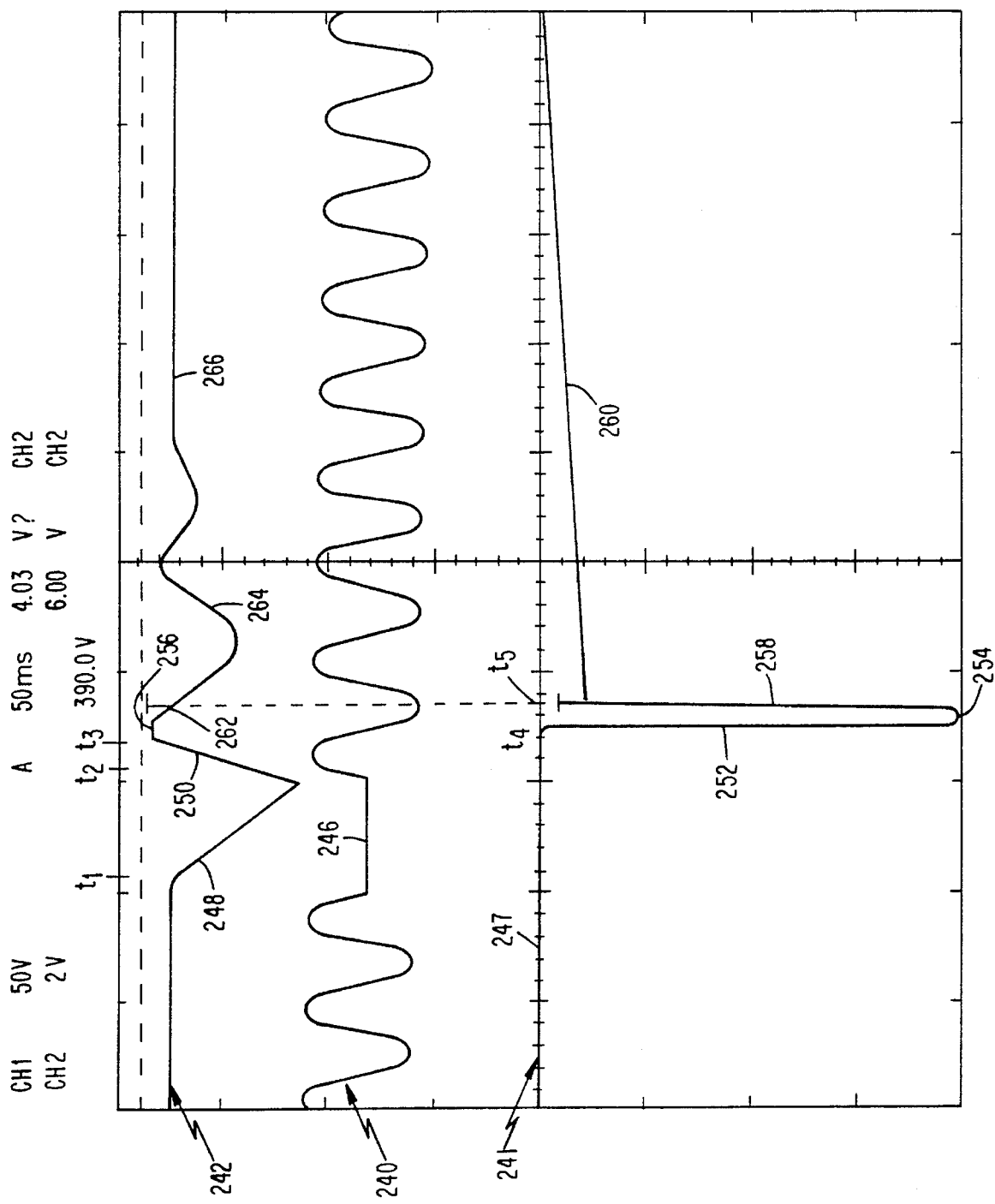
FIG. 4 includes waveforms indicating operation of the device illustrated in FIGS. 1–3.

To provide a better understanding of the operation of the present invention, consider waveforms 240, 242 and 244, FIG. 4. Waveforms 240 and 242 respectively represent the AC voltage applied by source 212 to full wave rectifier 210 and the DC voltage supplied by capacitor network 218 to load 26, while waveform 244 represents the voltage at pin 13 of integrated circuit 55. Waveform 240 represents a sinusoidal waveform having an interruption (indicated by waveform segment 246) during the interval between times $T_1$ and $T_2$. During interruption of waveform segment 246, the voltage supplied to rectifier 210 has a zero value for 1.5 cycles of source 212 and the voltage supplied by capacitor network 218 to load 26 ramps downwardly, as indicated by waveform segment 248. During the interval from $T_1$ to $T_2$ there is no change in waveform 244 at pin 13 of integrated circuit 55.

When service from source 212 is resumed, at time $T_2$, there is a resumption in the sinusoidal shape of waveform 240, causing the voltage supplied by capacitor network 218 to load 216 to start ramping upwardly, as indicated by waveform segment 250. The voltage supplied by capacitor network 218 to load 26 increases to a predetermined level at time $T_3$ because of overshoot properties of boost regulator 216 and preregulator 20. When the output voltage of capacitor network 218 reaches the predetermined level at time $T_3$, the voltage applied to input terminal 35 of preregulator 20 causes the voltage at pin 8 of integrated circuit 51 to switch from the low to the high state to switch on transistor 92 and reduce the voltage at pin 10 of integrated circuit 55. The reduced voltage at pin 10 of integrated circuit 55 changes the output of comparator 120 from a high to a low state, in turn causing changes in the states of the outputs of AND gate 116 and inverter 114, to switch transistor 112 from a cutoff to a fully conducting state. This causes the voltage at pin 13 of integrated circuit 55 to suddenly drop as indicated by waveform segment 252, which begins only a few nanoseconds after time $T_3$.

The voltage of waveform 244 then drops virtually to ground and is maintained at this level for a few milliseconds, as indicated by waveform portion 254. During waveform portion 254, the voltage supplied by capacitor network 218 to load 216 remains relatively constant, as indicated by waveform portion 256; the supplied voltage then decreases as indicated by waveform portion 262. While the voltage supplied by capacitor network 218 decreases below the predetermined level as indicated by waveform portion 256, at time $T_5$ the abnormal condition no longer exists. Thereby the output of comparator 120 and the conducting state of transistor 112 change. At time $T_5$, the conducting state of transistor 112 changes from an ON to an OFF state, causing the voltage at pin 13 of integrated circuit 55, as indicated by waveform segment 258, to quickly ramp upwardly to a voltage that is determined by the reverse biased Zener diode voltage of Zener diode 230. Then the charging current flowing through Zener diode 230 is still in the reverse biased Zener diode mode to charge capacitor 232. Thereby, the voltage at pin 13 increases gradually, as indicated by waveform segment 260, until the voltage at pin 13 reaches the level of waveform segment 247 of waveform 244 prior to time $T_4$. The transition of the voltage at pin 13 from waveform segment 258 to waveform segment 260 occurs at time $T_5$. The voltage rate of change at pin 13 during waveform segment 260 is determined by the charging current value and the capacitance of capacitor 232.

During the interval while waveform segment 258 is being derived, the voltage supplied by capacitor network 218 to load 216 decreases somewhat, as indicated by waveform segment 262 of waveform 242. Thereafter, the voltage supplied by capacitor network 218 oscillates somewhat, as indicated by waveform segment 264 and then gradually ramps upwardly, as indicated by waveform segment 266. The upward ramping of waveform segment 266 ends when the voltage supplied by capacitor 218 to load 26 has the same value as the voltage supplied by the capacitor network to the load prior to time $T_1$. Hence, waveform segments 262, 264 aid in quickly restoring the converter output voltage to its target value and stay within a relatively high percentage of the desired value for the voltage supplied by capacitor network 218 to load 26; waveform segment 266 reaches (without overshoot) the desired value for the voltage supplied by capacitor network 218 to load 26. These two phenomena are provided because of the variable, voltage or current responsive resistive impedance of Zener diode 230.

Figure 5:
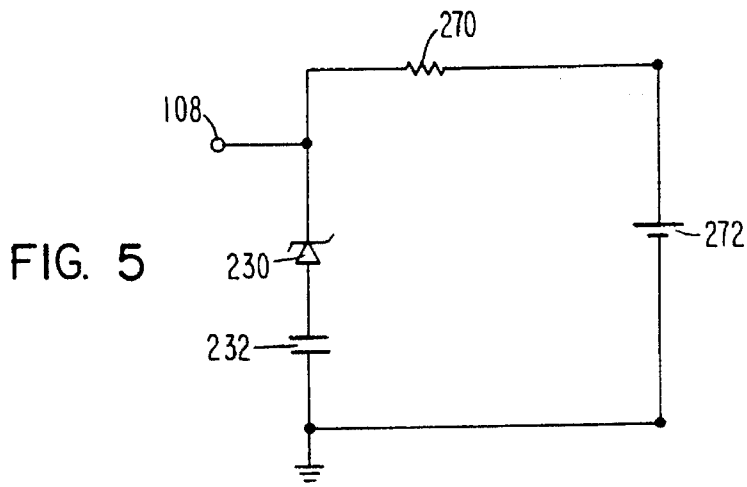
FIG. 5 is a circuit diagram of an alternate circuit for a portion of FIG. 3.

Reference is now made to FIG. 5 of the drawing, a further embodiment of the circuit of FIG. 3 for charging and discharging capacitor 232 through Zener diode 230. In FIG. 5, the constant current source is replaced by DC voltage source 272 and resistor 270, so that current flows from the voltage source through the resistor to the Zener diode and capacitor. The connection between resistor 270 and Zener diode 230 is to terminal 108, that is selectively connected to ground via the emitter collector path of transistor 112, FIG. 3. In response to Zener diode 230 being forward biased as a result of the voltage applied to it, capacitor 232 is quickly discharged. When the voltage applied to Zener diode 230 reverse biases the Zener diode, a stable voltage having a relatively high percentage of desired voltage at terminal 108 is quickly developed. A charging current flows from voltage source 272 through resistor 270 and the reverse biased Zener diode to capacitor 232 to slowly change the voltage at control terminal 108 to the desired voltage.

Figure 6:
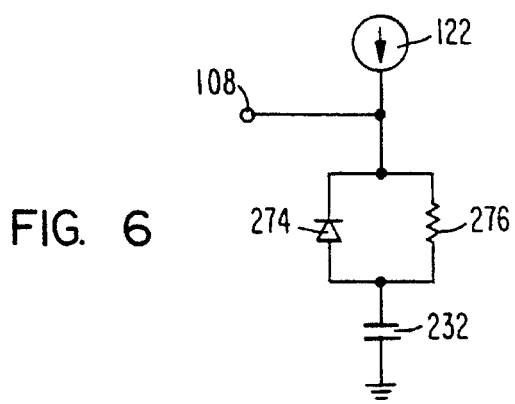
FIG. 6 is a circuit diagram of an alternate embodiment of the circuit illustrated in FIG. 5.

The circuit illustrated in FIG. 3 can be modified, as illustrated in FIG. 6, so that Zener diode 230 is replaced by the parallel combination of diode 274 and resistor 276. The cathode of diode 274 is connected to terminal 108 so the diode is forward biased to quickly discharge capacitor 232 in response to the voltage at terminal 108 being at ground. With terminal 108 ungrounded, current flows from source 122 through resistor 276 to quickly develop a stable voltage having a relatively high percentage of desired voltage at terminal 108 while diode 274 is reverse biased. A charging current flows from current source 122 through resistor 276 and capacitor 232 to slowly change the voltage at terminal 108 to the desired value.

Figure 7:
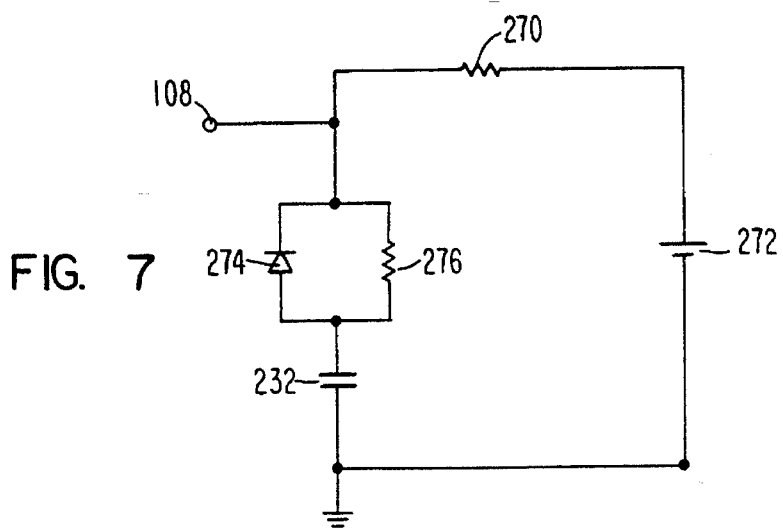
FIG. 7 is a circuit diagram of still another embodiment of the circuit illustrated in FIG. 5.

In still another embodiment of the invention, as illustrated in FIG. 7, the parallel combination of diode 274 and resistor 276 is employed with the series combination of resistor 270 and DC source 272 to control charging of capacitor 232 in response to the voltage at control terminal 108. The connection between voltage source 272, resistors 270 and 276 and diode 274 causes capacitor 232 to be quickly discharged through diode 274 when control terminal 108 is at ground potential, to forward bias the diode. Current flows from voltage source 272 through resistors 270 and 276 to quickly develop a stable voltage having a relatively high percentage of desired voltage at control terminal 108 while diode 274 is reverse biased in response to a high voltage being applied to control terminal 108. A charging current flows from voltage source 272 through resistors 270, 276 to capacitor 232 to slowly change the voltage at control terminal 108 to the desired voltage while diode 274 is back biased by a relatively high DC voltage being at terminal 108.

While there have been described and illustrated specific embodiments of the invention, it will be clear that variations in the details of the embodiments specifically illustrated and described may be made without departing from the true spirit and scope of the invention as defined in the appended claims.

I claim:

1. A power converter responsive to a source comprising a rectifier for deriving a rectified DC voltage in response to an AC source being connected to it, a switching regulator responsive to the rectified DC voltage for deriving variable duration DC pulses, a circuit for smoothing the DC pulses to a DC output voltage, a controller responsive to the rectified DC voltage and the switching regulator output for controlling the duration of the variable duration DC pulses, said controller responding to an abnormal condition of the converter for (a) reducing the width of the pulses flowing from the switching regulator to the circuit for smoothing at a relatively fast rate, (b) thereafter allowing an increase of the width of the pulses flowing from the switching regulator to the circuit for smoothing at a relatively fast rate and (c) then increasing the width of the pulses flowing from the switching regulator to the circuit for smoothing at a relatively slow rate, said controller including a circuit including a reactance, a variable impedance voltage or current responsive element and a charging source for the reactance, the circuit being connected so the variable impedance element (a) causes the reactance to be quickly discharged while widths of the pulses change rapidly in a first direction and (b) quickly develops a stable voltage having a relatively high percentage of desired voltage at the control terminal while widths of the pulses change rapidly in a second opposite direction and (c) allows a charging current flowing through it from the charging source to the reactance to slowly change the voltage at the control terminal to the desired voltage while the widths of the pulses change or are allowed to change slowly.

2. The converter of claim 1 wherein the abnormal condition is an interruption of the source.

3. The converter of claim 1 wherein the converter has a tendency to overshoot a maximum desired value for the DC output voltage in response to restoration of the source after an interruption thereof, the abnormal condition being the overshoot of the maximum desired value for the DC output voltage in response to restoration of the source after an interruption thereof.

4. The converter of claim 1 wherein the switching regulator comprises a shunt switch having a control terminal responsive to the means for controlling.

5. The converter of claim 1 wherein the reactance, variable impedance element and source include the series combination of a capacitor and Zener diode selectively connected in a series circuit with a current source so (a) the Zener diode is forward biased to quickly discharge the capacitor, (b) the Zener diode is reverse biased to quickly develop a stable voltage having a relatively high percentage of desired voltage at a control terminal between the current source and the series combination and (c) a charging current flows from the current source through the reverse biased Zener diode to the capacitor to slowly change the voltage at the control terminal to the desired voltage.

6. The converter of claim 1 wherein the reactance, variable impedance element and source include the series combination of a capacitor and Zener diode selectively connected in a series circuit with a second series combination of a voltage source and a resistor so (a) the Zener diode is forward biased to quickly discharge the capacitor, (b) the Zener diode is reverse biased to quickly develop a stable voltage having a relatively high percentage of desired voltage at a control terminal between the series combinations and (c) a charging current flows from the voltage source through the resistor and the reverse biased Zener diode to the capacitor to slowly change the voltage at the control terminal to the desired voltage.

7. The converter of claim 1 wherein the reactance, variable impedance element and source include the series combination of a capacitor and diode connected in parallel with a resistor selectively connected in a series circuit with a current source so (a) the diode is forward biased to quickly discharge the capacitor, (b) the current flows from the current source through the resistor to quickly develop a stable voltage having a relatively high percentage of desired voltage at a control terminal between the current source and the series combination of the capacitor with the diode in parallel with the resistor while the diode is reverse biased and (c) a charging current flows from the current source through the resistor and the capacitor to slowly change the voltage at the control terminal to the desired voltage.

8. The converter of claim 1 wherein the reactance, variable impedance element and source include a first series combination of a capacitor and a diode connected in parallel with a first resistor, interconnected in series with a second series combination of a voltage source and a second resistor, so (a) the diode is forward biased to quickly discharge the capacitor, (b) the current flows from the voltage source through the first and second resistors to quickly develop a stable voltage having a relatively high percentage of desired voltage at a control terminal while the diode is reverse biased and (c) a charging current flows from the voltage source through the first and second resistors and the capacitor to slowly change the voltage at the control terminal to the desired voltage, the control terminal being between the first and second series combinations.

9. The converter of claim 1 wherein the means for controlling responds to indications of the magnitudes of at least one current and voltage component in the converter for providing active power factor correction of the AC current and voltage components derived from the rectifier and to an indication of the DC output voltage for controlling the width of the pulses so the pulse width (a) quickly drops to zero in response to the DC output voltage exceeding a predetermined value, (b) thereafter quickly increases or is allowed to quickly increase in response to the DC output voltage being less than the predetermined value and (c) then increases at a protracted rate as a function of the indications of the magnitude of AC and DC currents and voltages in the converter; the fast rate to slow rate transition occurring at a predetermined percentage of a desired magnitude for the DC output voltage.

10. A power converter responsive to a power source for supplying a regulated DC voltage to a load comprising a rectifier, a regulator responsive to the rectifier for supplying the load with the regulated DC voltage, the regulator responding to AC current and voltage components of the converter to control the phases of AC voltage and current components derived by the rectifier so the AC voltage and current components derived by the rectifier tend to be in phase with each other, the regulator including means for deriving a parameter for controlling the load voltage, the parameter having a target value associated with normal operation of the converter for a desired DC load voltage, increases and decreases in the parameter value tending to respectively increase and decrease the load voltage, the regulator responding to abnormal operation of the converter to initially reduce the parameter value at a fast rate, then restore the parameter value to a large percentage of the target value therefor at a fast rate, and then restore the parameter value to its target value at a slow rate, the regulator including a capacitor charging circuit for: initially reducing the parameter value at a fast rate, then restoring the parameter value to a large percentage of the target value therefor at a fast rate, and then restoring the parameter value to its target value at a slow rate, the charging circuit including a Zener diode in series with the capacitor, the Zener diode being a variable voltage responsive resistive impedance.

11. The converter of claim 10 wherein the charging circuit includes a constant DC current source in series with the capacitor and the Zener diode, a switch in parallel with the voltage or current responsive element(s) and the capacitor, the switch being: (a) normally open, (b) closed in response to the abnormal condition and while the capacitor is rapidly discharged and the parameter value is rapidly changed in a first direction and (c) open while the parameter value is changing at the fast rate to a predetermined value and the capacitor is being slowly charged to change the parameter value from the predetermined value to the target value at the slower rate.

12. The converter of claim 11 wherein the converter is an AC-DC converter and the regulator responds to indications of the magnitudes of at least one current and voltage component in the converter for providing active power factor correction of the AC current and voltage components derived from the rectifier and to an indication of the DC load voltage for controlling the control signal so the DC load voltage (a) quickly decreases in response to the DC output voltage exceeding a predetermined value, (b) thereafter increases or is allowed to quickly increase in response to the DC output voltage being less than the predetermined value and (c) then increases at a protracted rate as a function of the indications of the magnitude of AC and DC currents and voltages in the converter; the quick to protracted transition occurring at a predetermined percentage of a desired magnitude for the DC output voltage.

* * * * *